US008547403B1

(12) United States Patent
Stiglitz

(10) Patent No.: US 8,547,403 B1
(45) Date of Patent: Oct. 1, 2013

(54) SMART GRAPHICS OBJECTS

(75) Inventor: Benjamin Stiglitz, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 473 days.

(21) Appl. No.: 12/854,861

(22) Filed: Aug. 11, 2010

(51) Int. Cl.
G06T 11/20 (2006.01)
G09G 5/00 (2006.01)
G06F 3/00 (2006.01)
G06F 3/048 (2013.01)

(52) U.S. Cl.
USPC .......... 345/680; 345/443; 345/676; 345/677; 345/679; 715/710; 715/810

(58) Field of Classification Search
USPC .............. 345/443, 676–680, 651, 710, 810, 345/964; 715/810, 964, 710, 443, 651, 676–680
See application file for complete search history.

(56) References Cited

U.S. PATENT DOCUMENTS

| | | | |
|---|---|---|---|
| 5,546,519 A * | 8/1996 | Berry | 715/763 |
| 6,256,030 B1 * | 7/2001 | Berry et al. | 715/854 |
| 7,369,130 B2 * | 5/2008 | Kawabe et al. | 345/474 |
| 2002/0101450 A1 * | 8/2002 | Magendanz et al. | 345/764 |
| 2006/0224977 A1 * | 10/2006 | Albrecht et al. | 715/760 |
| 2007/0146325 A1 * | 6/2007 | Poston et al. | 345/163 |
| 2010/0083172 A1 * | 4/2010 | Breeds et al. | 715/810 |

OTHER PUBLICATIONS

Steve Johnson—Perspection, Inc, Microsoft Office PowerPoint 2007 on Demand, 2006, Que, Chapter 4, p. 105-150, ISBN: 978-0-7897-3643-7.*
Steven Holzner, Special Edition Using Microsoft Office Visio 2007, 2007, Que, Chapter 12, p. 503-542, ISBN: 978-0-7897-3686-4.*

* cited by examiner

Primary Examiner — Aaron M Richer
Assistant Examiner — Michael J Cobb
(74) Attorney, Agent, or Firm — Fletcher Yoder PC

(57) ABSTRACT

A method for receiving, via a computer, a selection of a drawing line is provided. The drawing line has a first end point and a second end point. The drawing line is displayed in a display area of a display device. The computer receives a selection of a change to the first end point and the second end point. The drawing line and a line end tool are then redisplayed in the display area of the display device based on an orientation of the drawing line.

21 Claims, 9 Drawing Sheets

SMART GRAPHICS OBJECTS

FIELD OF INVENTION

The present invention relates generally to the field of graphics editing and, in particular, to the field of drawing and displaying graphics objects in a graphics editing application.

BACKGROUND OF INVENTION

Current graphics editing applications typically have a tool to allow a user to draw a graphics object, such as a line or an arrow. For example, the user draws the line in the graphics editing application from the tail to the head. The user is able to select various options from a user interface for the type of end points of the line (i.e., the tail and the head) to create an arrow. For example, a user may select a ▲ for the head and a ● for the tail. However, in current graphics editing applications, portions of the graphics object, such as the end points of the line drawn by a user on a canvas, do not match the controls or options, such as the orientation of the end points of an arrow, displayed on the user interface.

SUMMARY OF THE INVENTION

Accordingly, the present invention is directed to a system and method for drawing and displaying graphics objects, such as a line having end points (i.e., line ends), that substantially obviates one or more problems due to limitations and disadvantages of the related art.

In an embodiment, the present invention provides a method for receiving, via a computer, a selection for a drawing line. The drawing line has a first end point and a second end point. The drawing line is displayed in a display area of a display device. The computer receives a selection of a change to the first end point and the second end point. The drawing line and a line end tool are then redisplayed in the display area of the display device based on an orientation of the drawing line.

In another embodiment, a system comprises one or more processors, memory, a display device, and one or more programs stored in memory, where the one or more programs have instructions to receive a selection for a drawing line, the drawing line having a first end point and a second end point, display the drawing line in a display area of the display device, receive at least one selection for a change of at least one of the first end point and the second end point, and redisplay in the display area of the display device, the drawing line with the at least one selected end point change and a line end tool based on an orientation of the drawing line.

In yet another embodiment, a computer-readable storage medium stores one or more programs configured for execution by a computer, the one or more programs having instructions to receive a selection for a drawing line, the drawing line having a first end point and a second end point, display the drawing line in a display area of a display device in communication with the computer, receive at least one selection for a change of at least one of the first end point and the second end point, and redisplay in the display area of the display device, the drawing line with the at least one selected end point change and a line end tool based on an orientation of the drawing line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of standalone system or client-server compatible system containing any type of client, network, server, and database elements.

Figure 1:
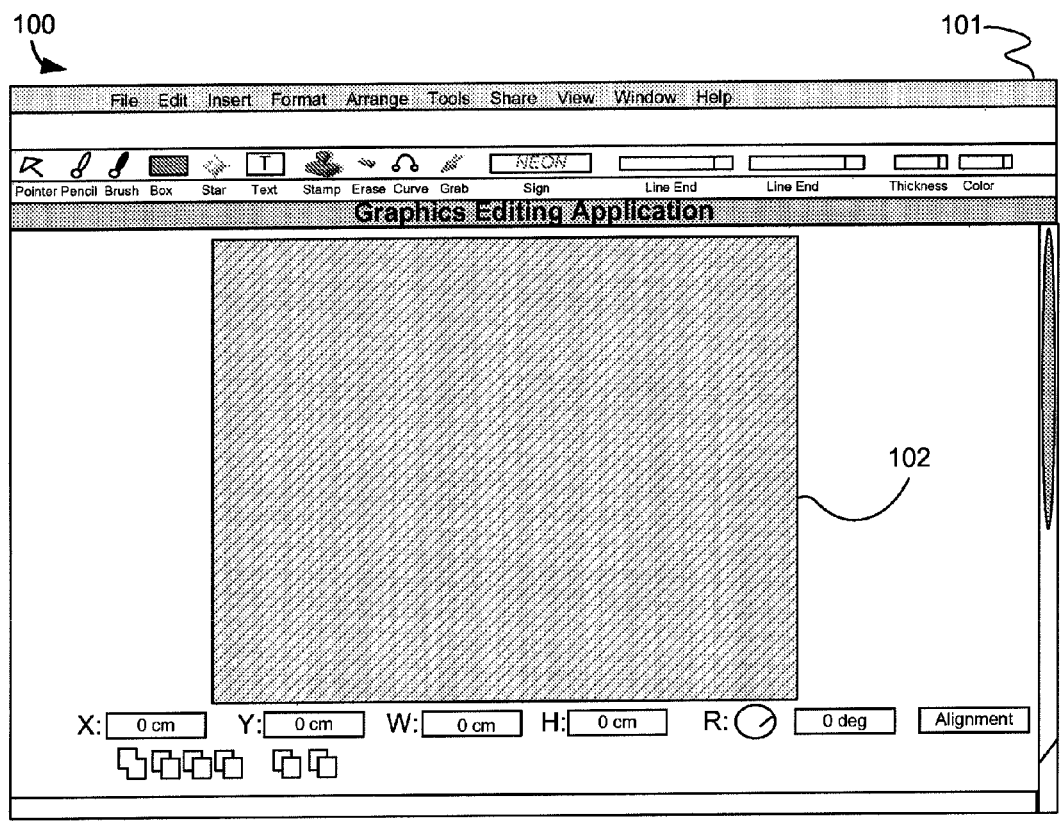
FIGS. 1-5 illustrate exemplary embodiments of a graphics editing application in accordance with the present invention.

FIG. 1 illustrates an exemplary embodiment 100 of a graphics editing application 101 in accordance with the present invention. In the exemplary embodiment 100, a user may activate the graphics editing application 101 to draw, edit, manipulate, and view various graphics, including shapes, such as lines, squares, circles, etc., and text, each separately or in combinations. In exemplary embodiment 100, a user may activate the graphics editing application 101 to draw, manipulate, edit, and view various graphics in a display area 102 (i.e., a drawing canvas).

Figure 2:
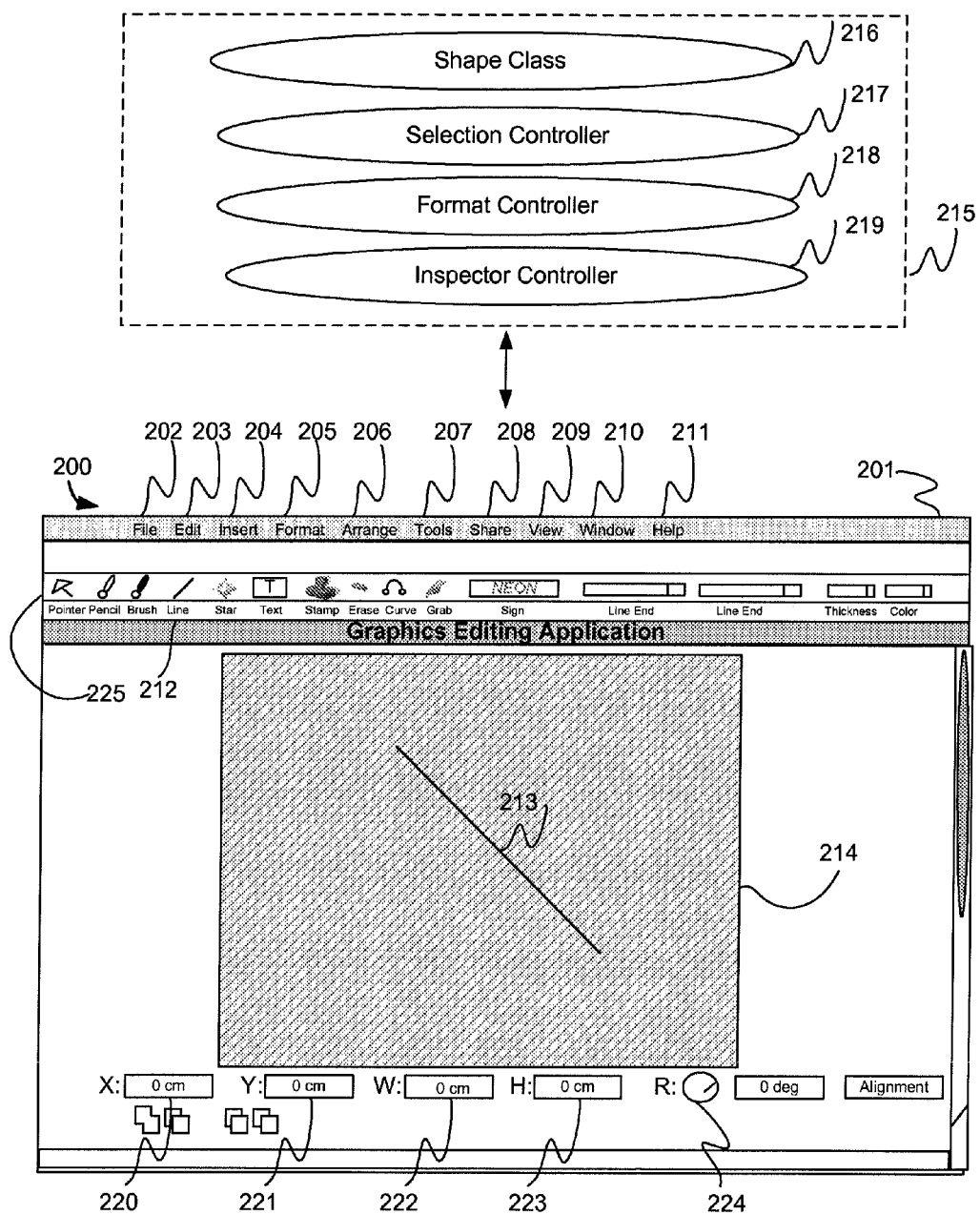

FIG. 2 illustrates an exemplary embodiment 200 of a graphics editing application 201 in accordance with the present invention. The graphics editing application 201 may include several menu features such as, for example, file 202, edit 203, insert 204, format 205, arrange 206, tools 207, share 208, view 209, window 210, and help 211. Each of these menu features 202-211 may further include additional features or options for creating, editing, and/or manipulating a graphics presentation through the graphics editing application 201. Each of the menu features 202-211, as well as any additional features or options, may have one or more corresponding modules/engines for implementing the execution of the invoked menu feature or option by sending instructions to one or more computer processors for execution.

In exemplary embodiment 200, the graphics editing application 201 may also include several icon shortcuts, such as icon shortcut 212, to menu features or options (e.g., 202-211). The icon shortcuts may have one or more corresponding modules/engines for implementing the execution of the invoked menu feature or option corresponding to the icon shortcut by sending instructions to one or more computer processors for execution. Icon shortcut 212 may be selected by a user to draw a non-closed path, such as line 213, in display area 214. A non-closed path may include straight lines, lines with curvatures, or any other shape that is not closed. The coordinates X 220 and Y 221 of line 213 or other graphics object drawn in display area 214 may be displayed by the graphics editing application 201. The width 222, height 223, and rotation 224 of line 213 or other graphics object drawn in display area 214 may also be displayed by the graphics editing application 201.

In exemplary embodiment 200, the graphics editing application 201 may interact and communicate with module 215. Module 215 may be implemented in an object-oriented programming language, such as Objective-C, C, C++, and/or Java. Module 215 may be a class library storing classes. For example, the classes may include a shape class 216, selection controller 217, format controller 218, and inspector controller 219.

In exemplary embodiment 200, each shape drawn in display area 214 may be considered a graphics object. Data associated with the graphics object may be stored in a file, such as an XML file, arbitrary binary encoding file, or other scripting language file type. Each graphics object may be called a "Shape," which has a geometry (i.e., a height, width, and/or rotation) and a path. The geometry and path for each graphics object may be stored in the XML file or other file in memory. When a user draws a graphics object, such as line 213, in display area 214, shape class 216 may be called or invoked to inquire about the properties of the graphics object. Shape class 216 may determine what graphics object a user drew based on the properties of the graphics object, such as the path, geometry, coordinates 220 and 221, height 222, width 223, rotation 224, or other information related to the graphics object. For example, if the path is closed based on the coordinates 220 and 221, shape class 216 may identify the object as a square or circle. If there are two end points in display area 214 based on coordinates 220 and 221, shape class 216 may identify the object as a line or other non-closed path.

In exemplary embodiment 200, selection controller 215 may be another class that interacts with shape class 216, format controller 218, and inspector controller 219. Selection controller 215 may be considered a form of arbitrator of what was drawn in display area 214. For example, a user may draw line 213 in display area 214 and select line 213 using selection tool 225. Upon making a selection, graphics editing application 201 may communicate with module 215. Selection controller 217 may be invoked based on the selection. For any event, such as a user selection, or exception that occurs in graphics editing application 201, selection controller 217 may be invoked. Selection controller 217 may handle or process the events or exceptions. For example, selection controller 217 may send out an event or exception to the other classes, such as format controller 218 and inspector controller 219, in module 215 to notify the other classes that a graphics object, such as line 213, has been drawn or selected in display area 214. Selection controller 217, format controller 218, or inspector controller 219 may examine or iterate through the selected graphics objects, such as line 213, in display area 214 to determine what icons or other tools should be displayed in graphics editing application 201.

Figure 3:
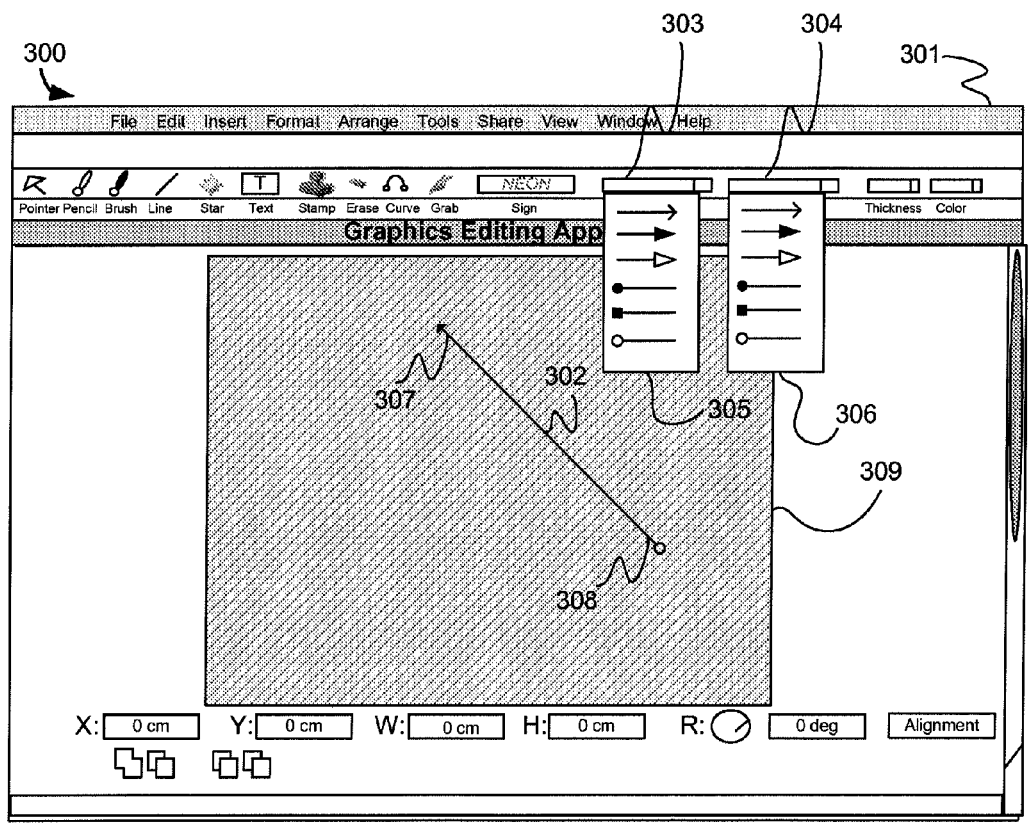

FIG. 3 illustrates an exemplary embodiment 300 of a graphics editing application 301 in accordance with the present invention. Graphics editing application may display line end tools 303 and 304 for changing the properties of line 302 or other non-closed shape. Other tools may also be displayed for line 302 or other non-closed shape, as illustrated via line end dropdown menus 305 and 306. The line end tools 303 and 304 may be displayed in graphics editing application 301 based on the analysis (i.e., iterations or examination) performed by any one or combination of shape class 216, selection controller 217, format controller 218, or inspector controller 219 as described above. It should be noted that in exemplary embodiment 300, different tools may be displayed based on the type of shape, which is determined based on the analysis described above. A user may select and graphics editing application 301 may receive a selection of a setting for the first end point 307 and a setting for the second end point 308 of line 302 using the line tools 303 and 304. In exemplary embodiment 300, the default setting for displaying line 302 may be the first end point (i.e., the head) 307 of line 302 being displayed on the left hand side of display area 309 and the second end point (i.e., the tail) 308 of line 302 being displayed on the right hand side of display area 309. In addition, in exemplary embodiment 300, an additional default setting may be set when a user initially draws a line in display area 309—the second end point (i.e., the tail) 308 of line 302 is set where the user first clicks in display area 309.

Figure 4:
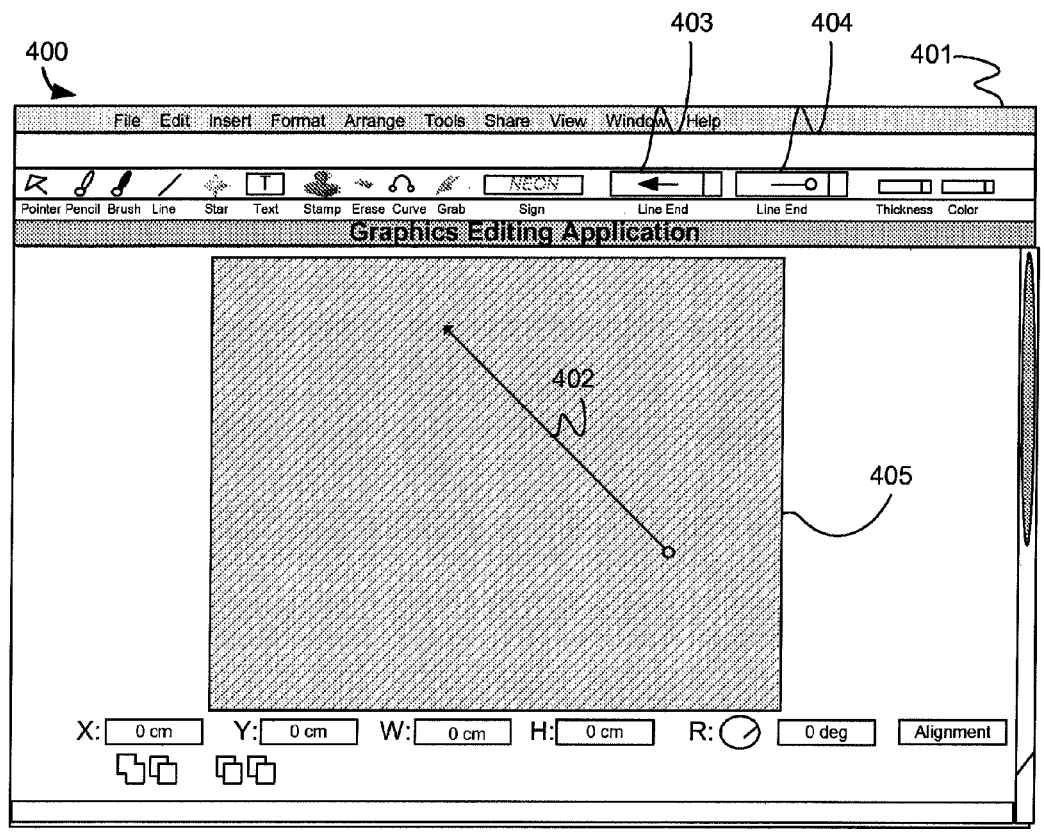

FIG. 4 illustrates an exemplary embodiment 400 of a graphics editing application 401 in accordance with the present invention. In exemplary embodiment 400, graphics editing application 401 displays line end tools 403 and 404 based on the orientation of line 402. In particular, the head of a line displayed in the left line control tool 403 and the tail of a line displayed in the right line control tool 404 are oriented in the same direction as line 402 drawn and displayed in display area 405.

Figure 5:
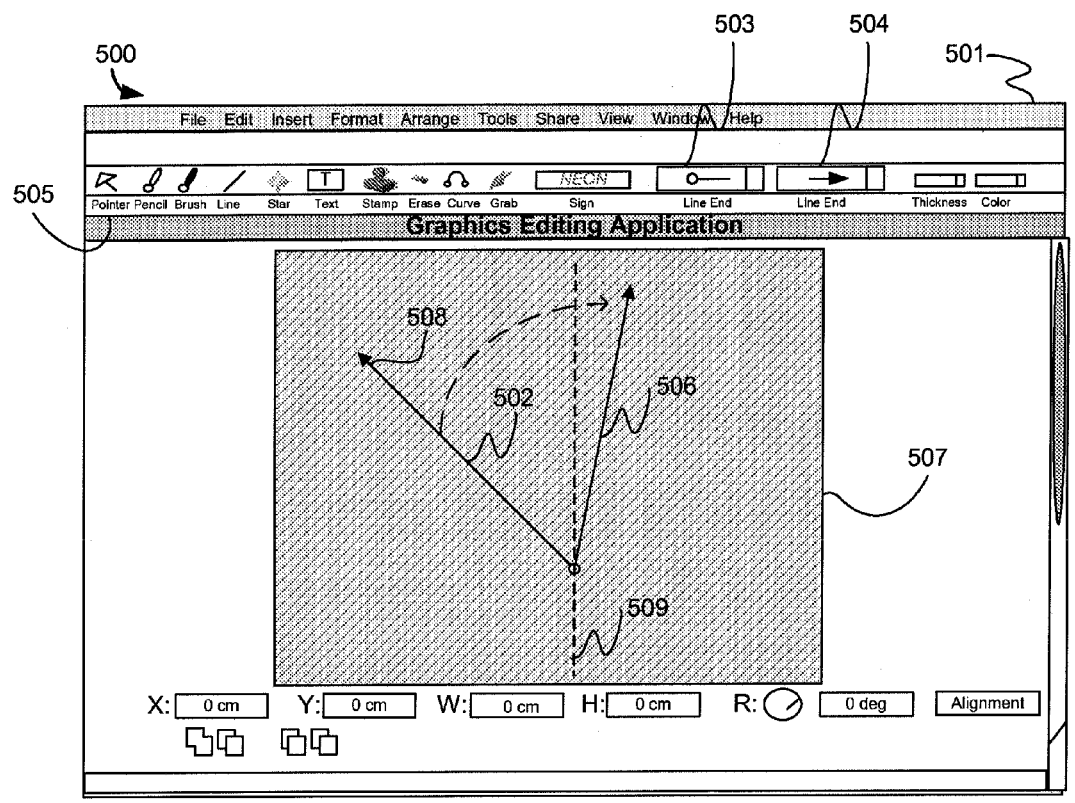

FIG. 5 illustrates an exemplary embodiment 500 of a graphics editing application 501 in accordance with the present invention. In exemplary embodiment 500, a user selects line 502 using selection tool 505. Graphics editing application 501 may receive a selection of a change to line 502 within display area 507. Any selection of a change to line 502 may generate an event, which invokes selection controller 217. For example, a change to line 502 may be a movement of the entire line 502 to another location within display area 507. Another change may be a rotation of the head 508 of line 502 resulting in line 506. Yet another change may be a rotation of the tail of line 502 (not shown). In exemplary embodiment 500, line 502 is rotated across vertical threshold 509 (i.e., y-axis). This is considered an event. Selection controller 502 may be invoked and may determine how line end tools 503 and 504 will be displayed in graphics editing application 501. In exemplary embodiment 500, when line 502 crosses vertical threshold 509 to create line 506, line end tools 503 and 504 also change to be oriented in the same manner as line 506 and are redisplayed in graphics editing application 501. In particular, the left line end tool 503 and the right line end tool 504 are oriented in the same direction as line 506 drawn and displayed in display area 507. While exemplary embodiment 500 uses a vertical threshold 509 as the threshold for when line end tools 503 and 504 change orientation, other thresholds, such as a horizontal threshold (i.e., x-axis) may be used.

The exemplary embodiments 200, 300, 400, and 500 are described using a non-closed shape, such as a line. However, other shapes, such as callout boxes, may be used. The interface controls related to the specific shape may change with the movement or any changes made to the shape in the display area as described above. For example, a shape, such as a circle or callout box, may be drawn and displayed in a display area. A user may select the circle or callout box to make a change. Upon selecting the shape, interface controls related to the specific shape may be displayed. If a user selects a callout box to move the portion of the box that points to another object, the interface controls may be redisplayed based on the orientation of the portion of the box that points to another object in a similar manner to the arrow or line.

Figure 6:
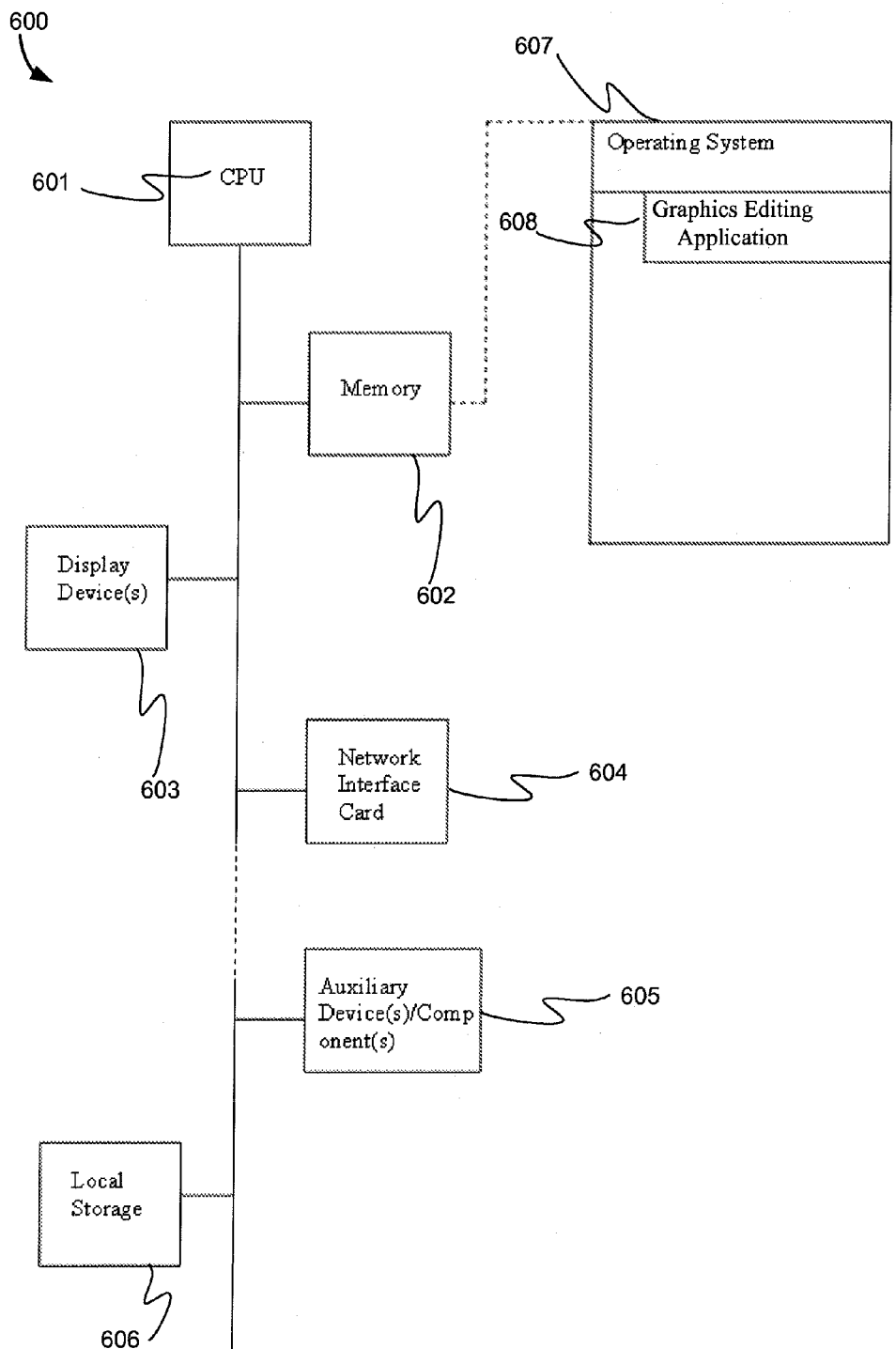
FIG. 6 illustrates an exemplary system block diagram of a system executing the graphics editing application in accordance with the present invention.

FIG. 6 illustrates an exemplary system block diagram of a system 600 executing graphics editing application 608. The system may include a computer processing unit (CPU) 601, memory 602 (e.g., volatile or non-volatile), display device(s) 603, network interface card (NIC) 604, an interface for auxiliary device(s)/component(s) 605, and local storage 606 (e.g., non-volatile). An operating system 607 may reside in local storage 606, remotely on a network accessible by the NIC 604, and/or memory 602. Instructions being executed by the CPU 601 may be fetched from memory 602 and may include instructions from one or more modules of graphics editing application 608 and/or one or more other applications. The XML file described above may reside in local storage 606, memory 602, and/or on a network accessible by the NIC 604. The system 600 may be a handheld device, laptop computer, desktop computer, server, or some other system capable of housing the components 601-606.

Figure 7:
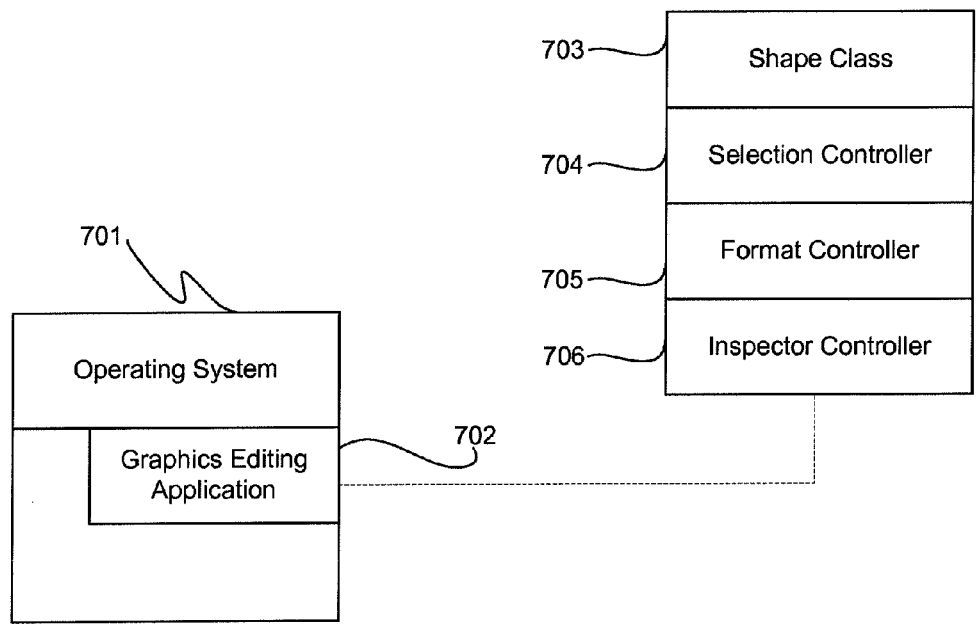
FIG. 7 illustrates an exemplary module block diagram of the execution of the modules of the graphics editing application in accordance with the present invention.

FIG. 7 illustrates an exemplary module block diagram of the execution of modules of the graphics editing application 702 in accordance with the present invention. The shape class 703, selection controller 704, format controller 705, and inspector controller 706 may be implemented as part of graphics editing application 702 or as separate programs or applications. The graphics editing application 702 may be executed via an operating system 701 responsible for managing the system on which it is stored or configured to manage.

Figure 8:
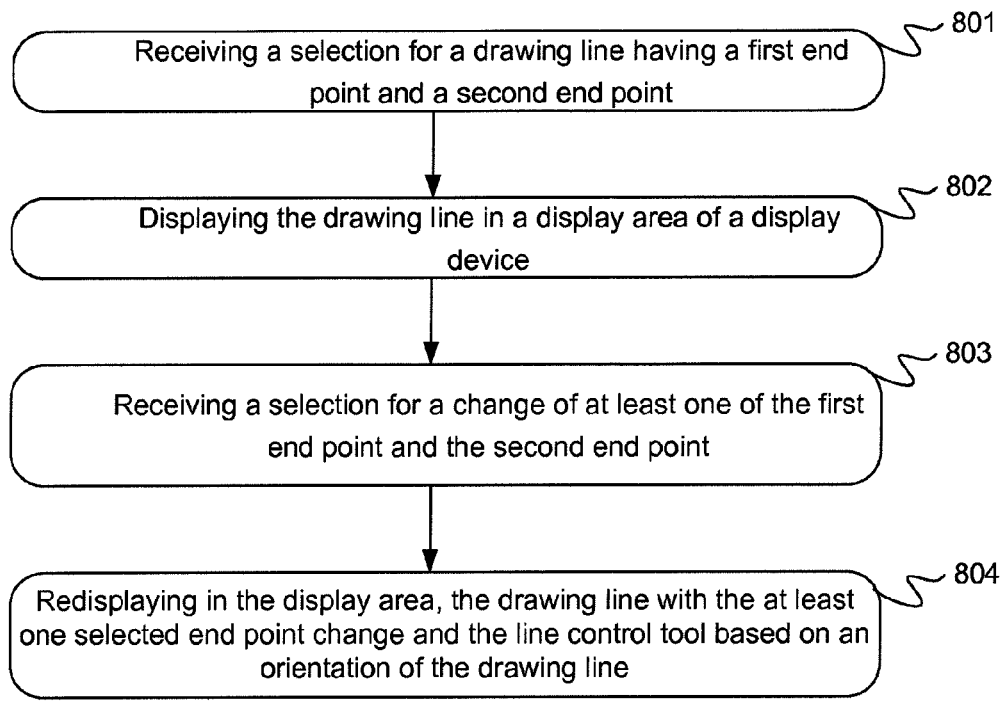
FIG. 8 illustrates an exemplary process flow in accordance with the present invention.

FIG. 8 illustrates an exemplary process flow in accordance with the present invention. At step 801, a computer, such as that described in FIG. 6, may receive a selection for a drawing line having a first end point and a second end point. At step 802, the drawing line may be displayed in a display area of a display device, such as display device 603. At step 803, the computer may receive a selection for a change of the first and/or second end point of the drawing line. At step 804, the drawing line having the selected change to the first and/or second end point of the drawing line and a line end tool may be redisplayed in the display area of the display device based on an orientation of the drawing line. In addition, the line end tool may be redisplayed outside of the display area in another portion of the interface.

Figure 9:
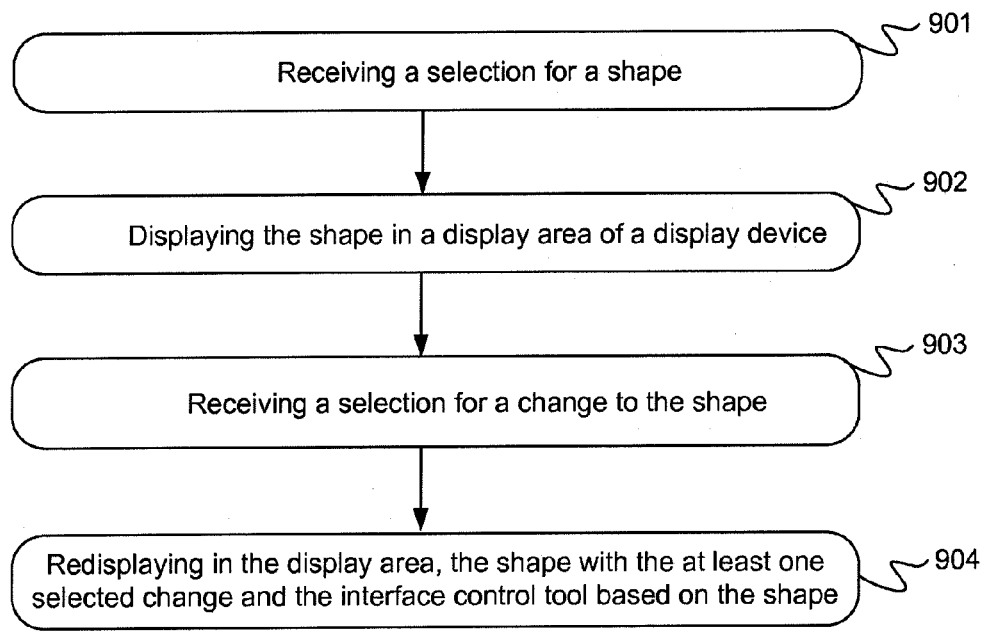
FIG. 9 illustrates an exemplary process flow in accordance with the present invention.

FIG. 9 illustrates an exemplary process flow in accordance with the present invention. At step 901, a computer, such as that described in FIG. 6, may receive a selection for a shape. At step 902, the shape may be displayed in a display area of a display device, such as display device 603. At step 903, the computer may receive a selection for a change to the shape. At step 904, the shape with the change and an interface control tool may be redisplayed in a display area of the display device based on the shape. In addition, the interface control tool may be redisplayed outside of the display area in another portion of the interface.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

The invention claimed is:

1. A method, comprising:
receiving, via a computer, a selection for a drawing line, the drawing line having a first end point and a second end point;
displaying the drawing line in a first region of a display area of a display device in communication with the computer;
receiving, via the computer, at least one selection for a change of at least one of the first end point and the second end point; and
redisplaying in the display area of the display device, the drawing line with the at least one selected end point change and a line end tool based on an orientation of the drawing line resulting from a rotation of the drawing line in the first region of the display area, wherein the line end tool comprises a toolbar icon located in a second region of the display area separate from the first region of the display area.

2. The method of claim 1, wherein the orientation of the drawing line is based on a vertical threshold.

3. The method of claim 1, wherein the step of redisplaying the line end tool includes redisplaying the line end tool to have the same orientation as the drawing line.

4. The method of claim 1, wherein the drawing line is a non-closed path.

5. The method of claim 1, wherein the drawing line is an arrow.

6. The method of claim 5, wherein the first end point is a head of the arrow and the second end point is a tail of the arrow.

7. The method of claim 1 further comprising the steps of:
selecting the drawing line;
invoking a selection controller;
determining using event or exception handling a type of the drawing line by the selection controller; and
displaying the line end tool based on the type of the drawing line.

8. A system, comprising:
one or more processors;
memory;
a display device in communication with the one or more processors;
one or more programs stored in the memory, the one or more programs comprising instructions to:
receive a selection for a drawing line, the drawing line having a first end point and a second end point;
display the drawing line in a first region of a display area of the display device;
receive at least one selection for a change of at least one of the first end point and the second end point; and
redisplay in the display area of the display device, the drawing line with the at least one selected end point change and a line end tool based on an orientation of the drawing line resulting from a rotation of the drawing line in the first region of the display area, wherein the line end tool comprises a toolbar icon located in a second region of the display area separate from the first region of the display area.

9. The system of claim 8, wherein the orientation of the drawing line is a vertical threshold.

10. The system of claim 8, wherein the one or more programs further comprise instructions to redisplay the line end tool to have the same orientation as the drawing line.

11. The system of claim 8, wherein the drawing line is a non-closed path.

12. The system of claim 8, wherein the drawing line is a portion of a callout box pointing to an object to which the callout box applies.

13. The system of claim 12, the one or more programs further comprise instructions to redisplay the line end tool to have the same orientation as the portion of the callout box pointing to the object to which the callout box applies.

14. The system of claim 8 further comprising one or more programs including instructions to:

select the drawing line;
invoke a selection controller;
    determine using event or exception handling a type of the drawing line by the selection controller; and
    display the line end tool based on the type of the drawing line.

15. A non-transitory computer-readable storage medium storing one or more programs configured for execution by a computer, the one or more programs comprising instructions to:
receive a selection for a drawing line, the drawing line having a first end point and a second end point;
display the drawing line in a first region of a display area of a display device in communication with the computer;
receive at least one selection for a change of at least one of the first end point and the second end point; and
redisplay in the display area of the display device, the drawing line with the at least one selected end point change and a line end tool based on an orientation of the drawing line resulting from a rotation of the drawing line in the first region of the display area, wherein the line end tool comprises a toolbar icon located in a second region of the display area separate from the first region of the display area.

16. The computer-readable storage medium of claim 15, wherein the orientation of the drawing line is based on a vertical threshold.

17. The computer-readable storage medium of claim 15, wherein the one or more programs further comprise instructions to redisplay the line end tool to have the same orientation as the drawing line.

18. The computer-readable storage medium of claim 15, wherein the drawing line is a non-closed path.

19. The computer-readable storage medium of claim 15, wherein the drawing line is an arrow.

20. The computer-readable storage medium of claim 19, wherein the first end point is a head of the arrow and the second end point is a tail of the arrow.

21. The computer-readable storage medium of claim 15 further comprising one or more programs including instructions to:
select the drawing line;
invoke a selection controller;
determine using event or exception handling a type of the drawing line by the selection controller; and
display the line end tool based on the type of the drawing line.

\* \* \* \* \*